United States Patent [19]
Ellett

[11] Patent Number: 6,079,074
[45] Date of Patent: *Jun. 27, 2000

[54] PIPE PIG INJECTOR

[75] Inventor: James Richard Ellett, Edmonton, Canada

[73] Assignee: Argus Machine Co. Ltd., Edmonton, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,630

[22] Filed: Feb. 14, 1997

[51] Int. Cl.⁷ ........................................ B08B 9/04
[52] U.S. Cl. .............................. 15/104.062; 15/3.5
[58] Field of Search ............... 15/3.5, 3.51, 3.52, 15/104.062

[56] References Cited

U.S. PATENT DOCUMENTS

| | | |
|---|---|---|
| 3,028,996 | 4/1962 | Ellett . |
| 3,076,509 | 2/1963 | Burns .................................. 15/104.062 |
| 3,081,472 | 3/1963 | Van Dijk ............................ 15/104.062 |
| 3,177,513 | 4/1965 | Ellett . |
| 4,016,621 | 4/1977 | Slegers .............................. 15/104.062 |
| 4,073,303 | 2/1978 | Foley, Jr. . |
| 4,351,079 | 9/1982 | Fitzpatrick . |
| 4,435,872 | 3/1984 | Leikam . |
| 4,709,719 | 12/1987 | Littleton et al. . |
| 5,113,895 | 5/1992 | Le Devehat .............................. 15/3.5 |
| 5,186,757 | 2/1993 | Abney, Sr. . |

FOREIGN PATENT DOCUMENTS

| | | |
|---|---|---|
| 649678 | 10/1962 | Canada . |
| 0856600 | 8/1981 | U.S.S.R. ........................... 15/104.062 |

OTHER PUBLICATIONS

ITAG Standard Specification, Overheads PIC Systems IN 9–004, 2 pages, no date.

ITAG Pic Valve produce brochure, 8 pages, received Apr., 1996.

ARGUS product brochure, The Argus Pig Valve, 4 pages, Oct., 1996.

*Primary Examiner*—Randall E. Chin
*Attorney, Agent, or Firm*—Anthony R. Lambert

[57] ABSTRACT

A pig injector has a magazine having a plug at one end and connected to a pig injector valve at the other end. The pig injector valve has a rotatable pig receiving chamber with a length L. Plural pigs of length L between rounded ends are positioned end to end within the elongate interior cavity of the magazine. A method of injecting pigs into a pipe at a pig injector valve comprising: (a) storing plural pigs in a magazine connected to the pig injector valve; (b) rotating the ball of the pig injector valve to be in position to receive a pig and close the pipe; (c) moving a pig from the magazine into the pig injector valve; (d) rotating the ball of the pig injector valve to open the pig injector valve and release the pig in the pipe; (e) moving the pig away from the pig injector valve with fluid pressure in the pipe; and subsequently repeating steps (b)–(e) with a second pig. Steps (b)–(e) may be repeated plural times and at regular intervals.

20 Claims, 5 Drawing Sheets

Step 3

Step 4

Step 3

Step 2

Step 1

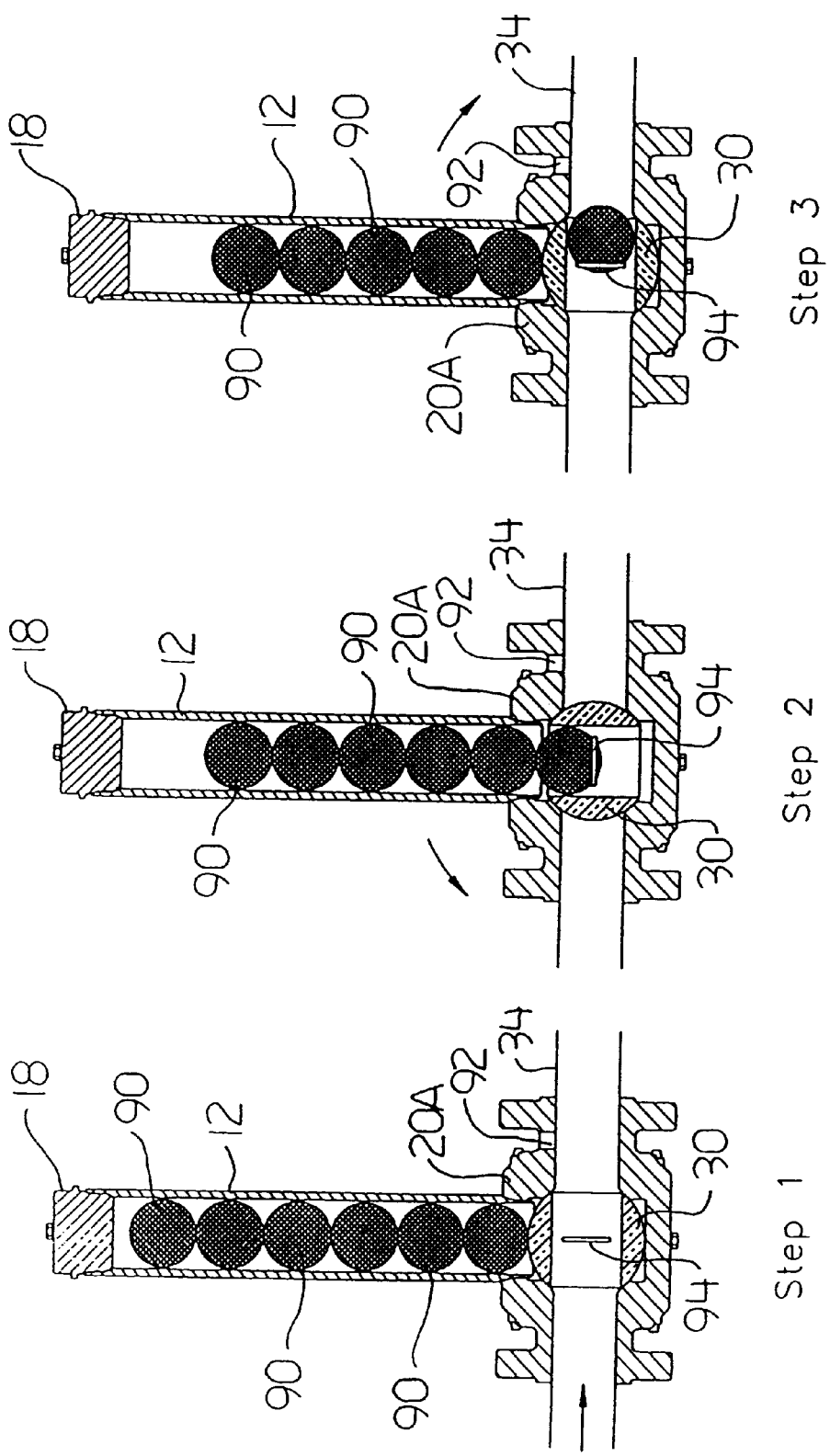

Step 5

Step 4

PIPE PIG INJECTOR

FIELD OF THE INVENTION

This invention relates to pig injectors used to inject pigs into pipes, and also to methods of operating pig injectors.

CLAIM TO COPYRIGHT

Not applicable

CROSS-REFERENCE TO OTHER APPLICATIONS

Not applicable

REFERENCE TO MICROFICHE APPENDIX

Not applicable

BACKGROUND OF THE INVENTION

Pig injectors having magazines for storing several pigs have been known at least since issuance of Canadian patent no. 649,678 and U.S. Pat. No. 3,028,996 by the inventor of the present invention. In these patents there is described a pig injector for injecting spherical pigs into a pipe, in which the pigs fall from a magazine into a T section extending perpendicularly from the pipe. The pigs may then be injected by a piston and rod arrangement into the pipe.

There is also known a multiple pig launching system made by ITAG. In this design, plural spherical pigs are stored in a magazine and released, one at a time, by a solenoid controlled finger into a rotatable pig launching valve. The pig launching valve has a ball with an interior bore and stops at the end of the bore for preventing the pig from moving the wrong way once the pig is placed in the pipe.

A further design for the launching of spherical pigs into a pipe is shown in U.S. Pat. No. 4,435,872 of Leikam. This design allows for the introduction of pigs without impeding flow of fluid in the pipe.

None of these designs is suitable for the introduction of elongate pigs into a pipe, and they require somewhat complicated metering systems, so that only one pig at a time is injected into the pipe. The present invention provides in accordance with one aspect of the invention a pig injector for injecting multiple elongate pigs and in accordance with another aspect a simplified metering design. An indicator of pig level in the magazine is also provided.

SUMMARY OF THE INVENTION

There is therefore provided in accordance with one aspect of the invention, a pig injector, comprising a magazine having a plug at one end and connected to a pig injector valve at the other end. The pig injector valve has a rotatable pig receiving chamber with a length L. Plural pigs of length L between ends, at least one of which ends and preferably both of which ends are rounded, are positioned end to end within the elongate interior cavity of the magazine.

In accordance with a further aspect of the invention, the pigs are spherical and the length of the pigs is their diameter. The rotatable pig receiving chamber may be defined by a blocked bore formed within a ball in the pig injector valve.

In accordance with a further aspect of the invention, the pigs are elongate. The rotatable pig receiving chamber may be a bore formed within a ball in the pig injector valve, with the diameter of the ball substantially equal to L.

In a further aspect of the invention, means, for example a weight, are provided to force pigs along the magazine towards the pig injector valve.

In a further aspect of the invention, a pig injector with an elongate magazine is provided with a pig level indicator indicative of the number of pigs in the magazine.

In a further aspect of the invention, the pig level indicator comprises a magnetic element within the magazine that moves with the pigs and visible magnetic sensors on the outside of the magazine. The magnetic element may be a magnet and the visible magnetic sensors may be hinged and spaced along the magazine such that location of the magnet adjacent a visible magnetic sensor causes the visible magnetic sensor to be displaced.

In a further aspect of the invention, the pig injector may include an indentation in the plug for receiving a C-wrench.

In a further aspect of the invention, there is provided a method of injecting pigs into a pipe at a pig injector valve, in which the pig injector valve has an interior rotatable ball with a bore formed within the ball, the bore and ball forming a rotatable pig receiving chamber having a length L. The method may be comprised of:

(a) storing plural pigs in a magazine connected to the pig injector valve;

(b) rotating the ball of the pig injector valve to be in position to receive a pig and close the pipe;

(c) moving a pig from the magazine into the pig injector valve;

(d) rotating the ball of the pig injector valve to open the pig injector valve and release the pig in the pipe;

(e) moving the pig away from the pig injector valve with fluid pressure in the pipe; and subsequently repeating steps (b)–(e) with a second pig. Steps (b)–(e) may be repeated plural times and at regular intervals.

In a further aspect of the invention, a method of securing pigs within a magazine comprises:

providing a magazine with an elongate interior cavity and an open end;

inserting plural pigs into the elongate interior cavity through the open end;

threading a plug onto the open end of the magazine; and tightening the plug with a C-wrench.

These and other aspects of the invention are described in the detailed description and claims that follow.

BRIEF DESCRIPTION OF THE DRAWINGS

There will now be described preferred embodiments of the invention, with reference to the drawing, by way of illustration, in which like numerals denote like elements and in which:

FIGS. 3A–3E are a series of schematics showing sequential insertion of spherical pigs into a pipe.

DETAILED DESCRIPTION OF PREFERRED EMBODIMENTS

Elongate in reference to a pig means that the pig, whose cross-section forms a circle in one plane, has a length along an axis normal to that plane that is greater than the diameter of the circle.

Figure 1:
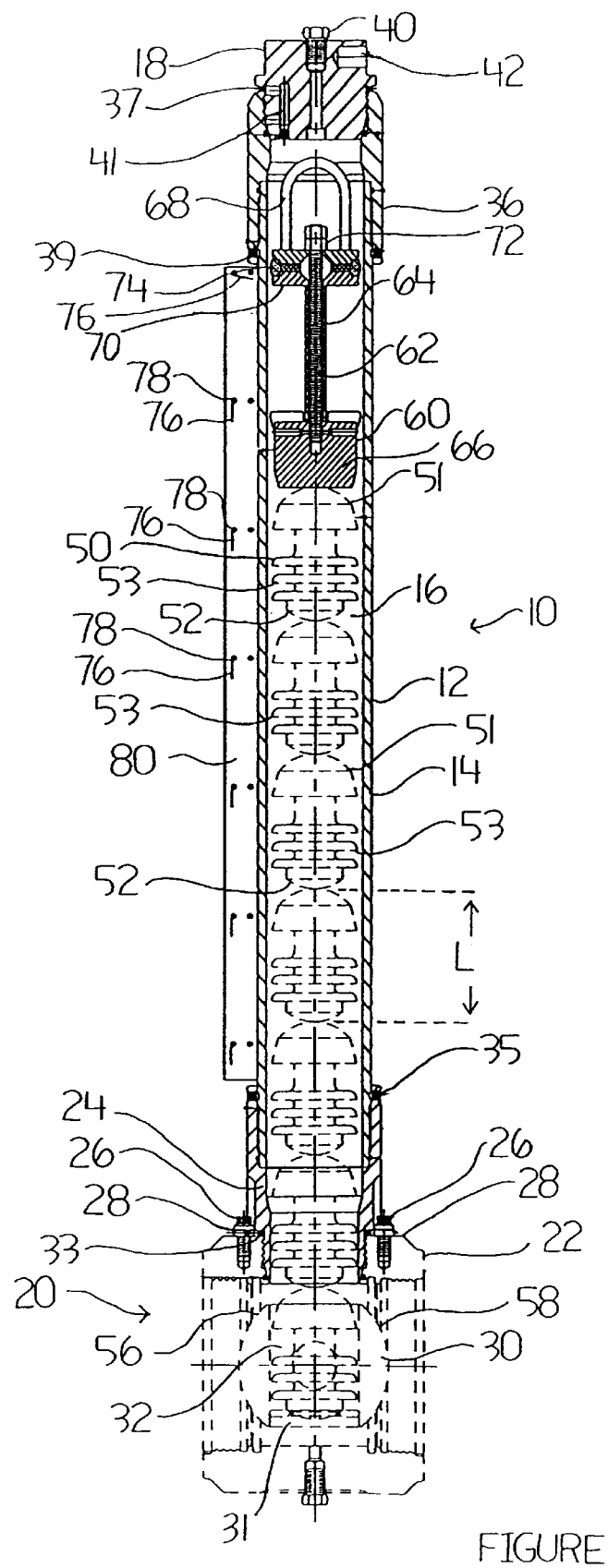
FIG. 1 is a section through a pig injector according to the invention.
Figure 2D:
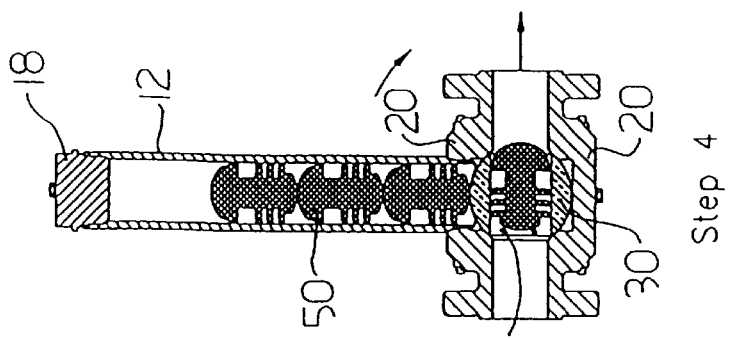
FIGS. 2A–2D are a series of schematics showing sequential insertion of elongate pigs into a pipe.
Figure 2C:
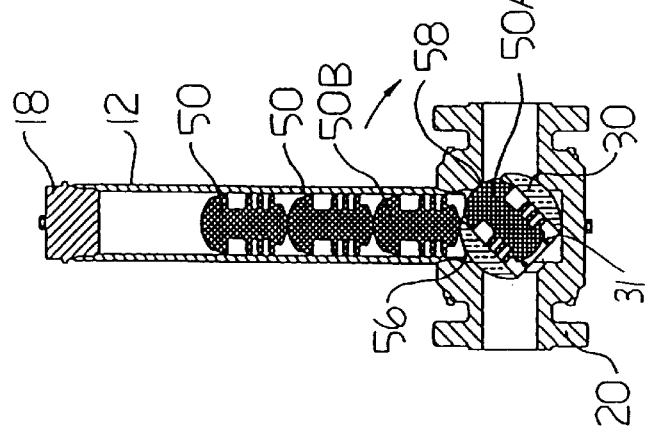
Figure 2B:
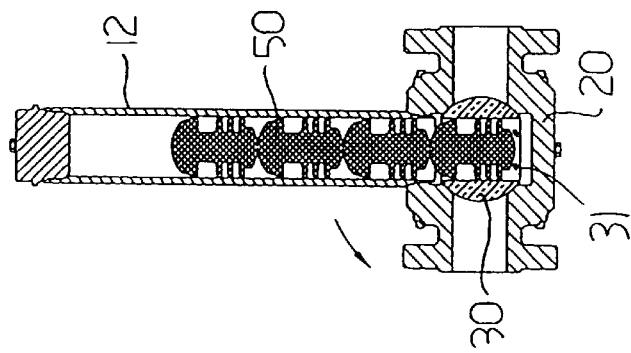

Referring to FIG. 1, a pig injector 10 includes a magazine 12 formed of a barrel 14 with an elongate interior cavity 16 extending from a first end capped by plug 18 and a second end inserted into a pig injector valve 20. Pig injector valves are well known in themselves and therefore will not be described in great detail. Suffice to say that the pig injector valve has a main body 22 into which an adaptor body 24 forming the second end of the magazine 12 is threaded and a ball 30 rotatably mounted within the main body 22. The ball 30 has an interior bore 32 forming a rotatable pig receiving chamber that may be rotated from a position aligned with the bore of a pipe 34 (the position is shown in FIGS. 2A, 2D, 3A, 3C and 3E), through oblique positions (FIG. 2C) to a position transverse to the bore of the pipe 34 (FIGS. 2B, 2C, and 3D). The adaptor body 24 is locked in place by capscrews 26 and locking bolts 28. O-ring seals 33, 35 seal the adaptor body 24 to the pig injector valve 20 and barrel 14 respectively.

A top sub 36 is threaded onto the end of the barrel 14 remote from the pig injector valve 20, and the plug 18 is threaded into the top sub 36. O-ring seals 37, 39 seal the top sub 36 to the plug 18 and barrel 14. The plug 18 is conventional, as used on pig injector valves such as pig injector valve 20, and includes pipe plugs 40 and 41, except that an opening 42 is drilled in the side of the plug 18 for insertion of the spike of a C-wrench (not shown) and the conventional hammer lugs are omitted.

As illustrated in FIG. 1, and FIGS. 2A–2D, within the magazine 12 are confined several elongate pigs 50 which are conventionally made of polyurethane. The elongate pigs 50 have circular cross-sections perpendicular to their central axes, have rounded ends 51, 52, and scraping ribs 53 intermediate the rounded ends. The scraping ribs 53 are conventional, and various configurations of scraping elements may be used, or may even be absent depending on the use being made of the pigs. The elongate pigs 50 preferably have rounded ends and the elongate pigs 50 must be about the same length (L) along their axes as the bore within the ball 30 of the pig injector valve 20. The bore of the ball 30 may extend substantially across the diameter of the ball 30, or may be stopped, such as by a bar or bars 31 to limit the bore to the length of the pigs 50 in the case where the pigs 50 are shorter than the diameter of the ball 30. At least one end and preferably both ends of the pigs 50 must be rounded such that as the ball 30 rotates with a pig (for example, 50A in FIG. 2C) within the bore 32, the next pig 50B in the stack of pigs 50 is prevented from movement downward until the edge 56 of the ball 30 moves into place to support the stack of pigs 50. At the same time, the rounded end of the pig 50A clears the interior shoulder 58 of the main body of the pig injector valve 20 (FIG. 2C). In the case where the pig 50 has a length L approximately equal to the diameter of the ball 30, both ends of the pig must be rounded, and the bars 31 are not required. In the case where the pigs 50 have an end that is not rounded, then the pigs 50 must be oriented in the magazine such that the rounded end of the pig, when it is adjacent the valve 20, points towards the other pigs 50 in the magazine.

Means are provided to force the pigs towards the pig injector valve. In one embodiment, this is accomplished by attaching the magazine 12 to the pig injector valve 20 such that it stands vertically, with gravity pulling the pigs 50 down towards the pig injector valve 20. The force of gravity on the pigs 50 themselves is assisted by providing a weight 60 at the top of the stack of pigs 50. The weight 60 may for example be made from a bolt 62 inserted through a sleeve 64 and threaded into a head 66, in which the head 66 provides the needed weight. A handle 68 is conveniently provided at the other end of the weight for removal of the weight 60 from the magazine 12. The handle 68 is secured to a disc 70 sandwiched between the sleeve 64 and a nut 72 on the bolt 62.

The barrel 14 is typically made of opaque material, preferably stainless steel, yet it is desirable to be able to determine the number of pigs remaining in the magazine from afar and without opening it. For this reason, the magazine 12 is also supplied with a pig level indicator indicative of the number of pigs in the magazine 12. The pig level indicator may be formed of a magnetic element, for example a magnet 74 carried on the weight 60, and magnetic sensors 76 on the outside of the magazine 12. The exemplary magnetic sensors 76 are hinged plates made of magnetically sensitive material that hang from pins 78 extending horizontally from a flange 80 secured along the length of the barrel 14. The magnetic sensors 76 are located and sized so as to be readily visible and for example may be coloured differently from the background, eg the barrel 14 to enhance their visibility. The magnetic sensors 76 may be designed differently than shown, and may require additional magnetic material and be balanced so that they move under a relatively weak magnetic field from the magnetic element 74. That is, the plates may hang from one end of a nearly balanced beam with a magnet on the other end, so that the plate moves to a new position when the magnet on the other end is deflected by the magnetic element 74.

The magnetic sensors 76 are spaced along the length of the magazine by about the same length as the pigs 50. When the magnetic element 74 on the weight 60 is adjacent one of the magnetic sensors 76, that magnetic sensor 76 visibly tilts, the more visibly if the barrel (or the flange 80) and the sensor 76 are differently coloured. For this manner of detecting the pig level, the barrel 14 is made of non-magnetic material This manner of detecting pigs has application to other discrete objects stored in an opaque container in a column.

Figure 2A:
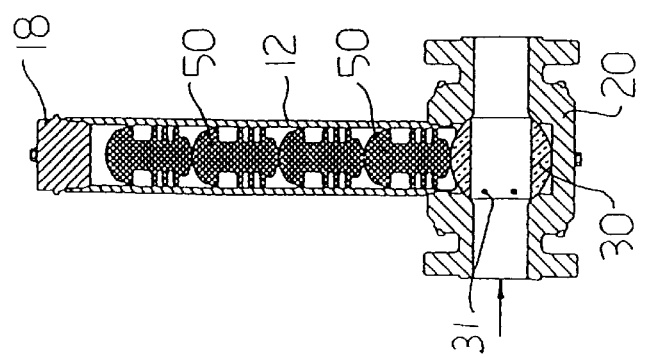

A method of using the pig injector of the invention is illustrated in FIGS. 2A–2D. Plural pigs 50, here shown as four, are stored in the magazine 12 until required as shown in FIG. 2A. The pig injector valve 20 is opened as shown in FIG. 2B (opened to the magazine that is) to receive a pig 50, which moves under gravity into the pig injector valve 20, and simultaneously close the pig injector valve 20 to prevent fluid flow along the pipe 34 as shown in FIG. 2B. The pig injector valve 20 is then rotated through the oblique position shown in FIG. 2C to the closed position (in relation to the magazine) shown in FIG. 2D, which opens the valve to fluid flow in the pipe 34, thus propelling the pig 50 along the pipe 34 in the direction of the arrow away from the pig injector valve.

This series of steps may be repeated as required, for example by remote control signals sent from a remote location. The control signals may be sent automatically, sending out several pigs at regular intervals. The control system is not shown since remote control for valves is well known in the art. Pigs launched automatically in this fashion may be retrieved conventionally using a wire basket.

Referring to FIGS. 3A–3E, an embodiment of a pig injector with plural spherical pigs 90 is shown. In this instance, the structure of the pig injector is the same as in the pig injector shown in FIG. 1 except for the pig injector valve 20A. Pig injector valve 20A differs from pig injector valve 20 in two ways. Firstly, the pig injection valve 20 includes a chemical or fluid injection port 92 for injection of fluid in conventional manner into the pipe 34. Secondly, a bar 94 is installed within the ball 30 to block the bore of the ball 30 and limit the length of the pig receiving chamber formed by the bore of the ball 30. The bar 94 acts as a barrier to movement of the balls 92 through the bore of the pig injector valve 20A.

Figure 3E:
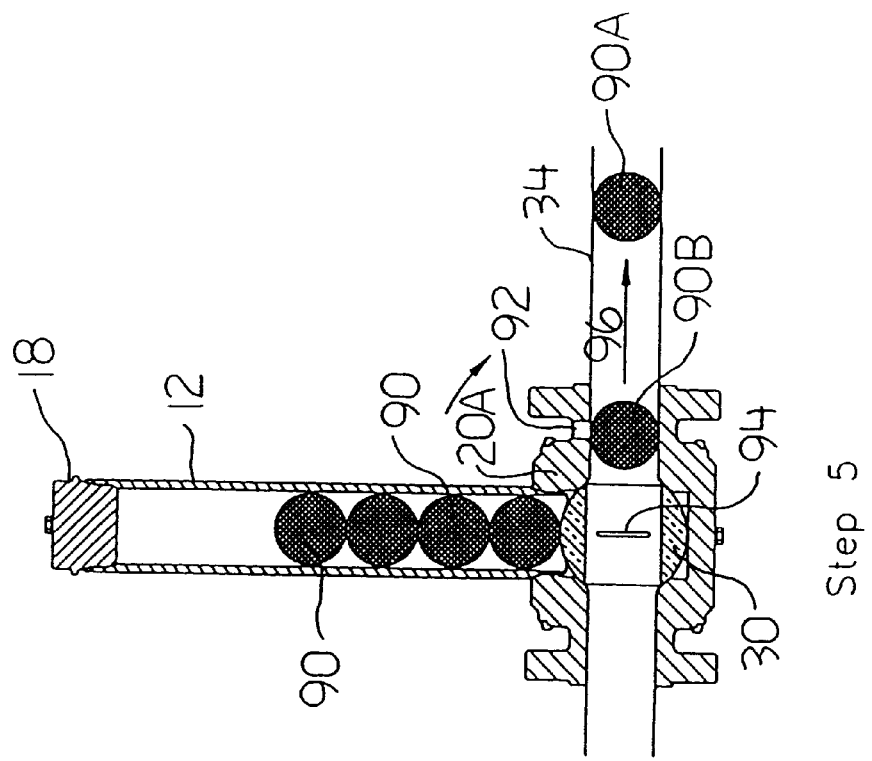
Figure 3D:
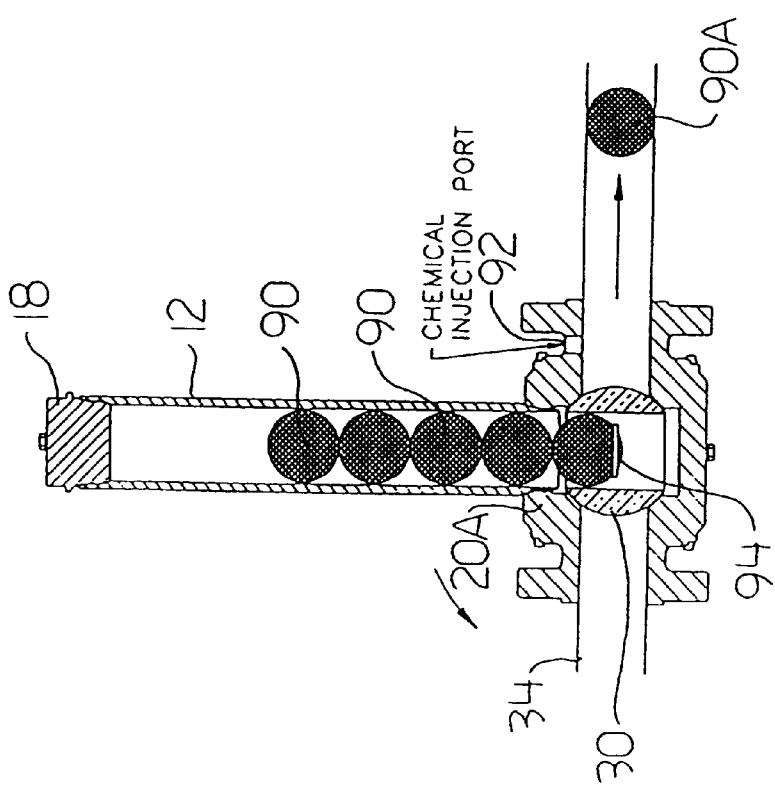

The manner of operation of the pig injector shown in FIGS. 3A–3E is as follows. FIG. 3A shows the pig injector with spherical pigs 90 stored in the magazine 12 awaiting a release signal. Upon the release signal being given, either manually or automatically, the ball 30 is rotated to be in position to receive a pig 90 and close the pipe 34. Weight of gravity, as an exemplary way of moving the pigs as shown in FIG. 3E, moves a pig 90 from the magazine 12 into the bore of the ball 30 of the pig injector valve 20A. The pig 90 falls only so far into the ball 30 as the bar 94 permits. The ball of the pig injector valve is then rotated to open the pig injector valve and release the pig in the pipe. Fluid pressure moves the pig 90, as shown in FIG. 3C, then moves the pig away from the pig injector valve 20A. The aforementioned steps may then be repeated with a second pig without reloading the magazine, and as many more times as there are pigs in the magazine. If desired, when the ball 30 of the pig injector valve 20A is rotated to close the pipe 34 and receive a second ball as shown in FIG. 3D, fluid, such as cleaning chemicals, can be injected at the injection port 92 to fill the pipe 34 behind pig 90A. A further pig 90B can then be released into the pipe in similar fashion to pig 90A with fluid filling the space 96 between the pigs 90A and 90B. The pigs 90A and 90B can then be moved down the pipe 34 by opening the pig injection valve 20A as shown in FIG. 3E with fluid filling the pipe between the two pigs.

Figure 4A:
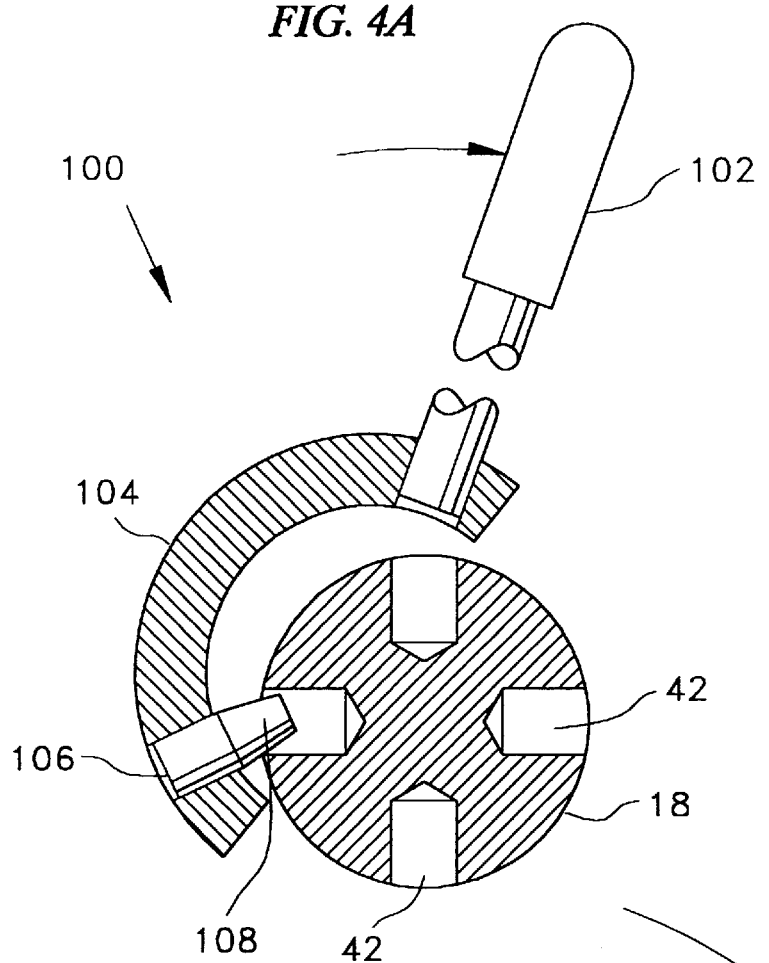
FIGS. 4A and 4B are sections through an entry plug of a pig injector according to the invention showing a manner of disengaging the entry plug.
Figure 4B:
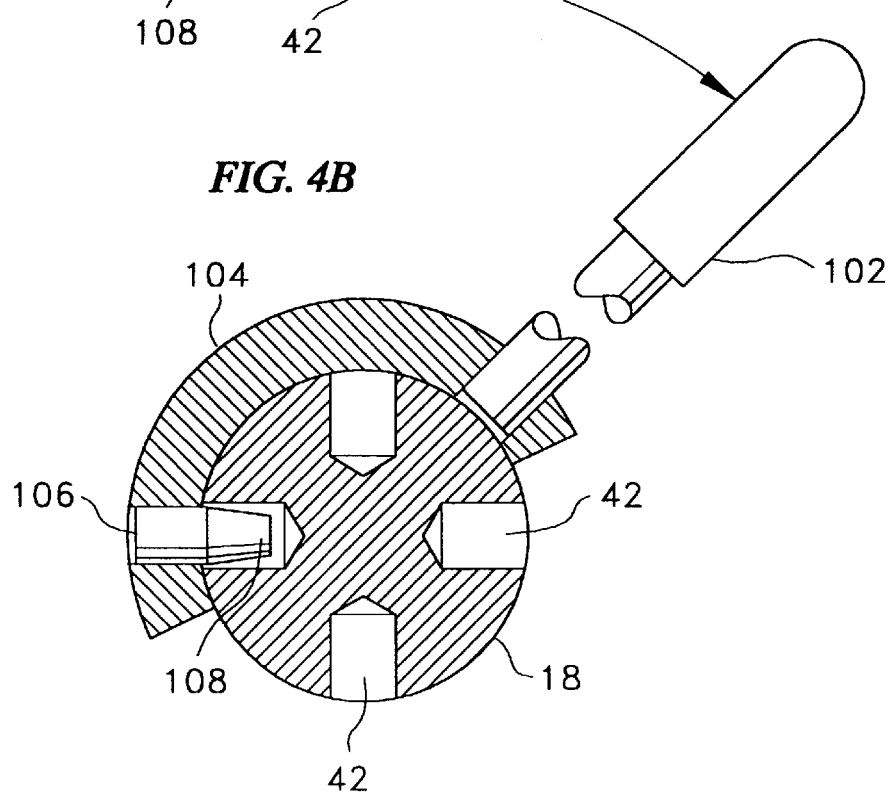

As shown in FIGS. 4A and 4B, in a preferred manner of removing the plug 18 from the magazine 12 to allow pigs 50 to be placed in the magazine 12, a C-wrench 100 may be used. As shown in FIGS. 4A and 4B, the plug 18 has four pin receiving holes 42 disposed symmetrically around the top of the plug 18. The C-wrench 100 has a handle 102, C-section 104 and pin 106. The pin 106 has a tapered end 108 and has a diameter slightly less than the holes 42 in the plug 18 so that the pin 106 has a small amount of play in the hole 42. The radius of curvature of the inside of the C-section 104 is the same as the radius of curvature of the outside of the plug 18.

In operation, the pin 106 is inserted in one of the openings 42, and the C-section moved away from the plug body as shown in FIG. 4A. The C-wrench 100 may then be snapped against the plug 18 by pressure on the handle 102, which causes a torque to be transmitted through the pin 106 onto the plug 18, thus rotating the plug 18 and overcoming the initial sticking of the plug.

Care must be taken, as with any pig injector, that, before the magazine 12 is opened for the introduction of pigs, any pressure in the magazine from the line is bled off. It will be noted that the desired length of the pig receiving chamber is the length such that, when the pig is located in the chamber, the rounded end of the pig (pointing towards the magazine) clears the shoulder 58, without allowing another pig to drop into the pig receiving chamber and be sheared by the advancing edge 56 of the ball.

A person skilled in the art could make immaterial modifications to the invention described and claimed in this patent without departing from the essence of the invention.

What is claimed is:

1. A pig injector, comprising:

a magazine having an elongate interior cavity and a first open end and a second open end;

the first open end forming an entry port for pigs and being capped by a plug;

a pig injector valve connected to the second end of the magazine, the pig injector valve having a rotatable pig receiving chamber with a length L, the pig receiving chamber being open at opposed ends to allow flow of fluids through the pig receiving chamber; and plural pigs positioned end to end within the elongate interior cavity of the magazine, including a first pig and a second pig in order ready to drop into the receiving chamber, the pigs each having at least one rounded end and having a length substantially equal to L, such that when the first pig is in the rotatable pig receiving chamber the second pig is in continuous contact with the first pig or the pig receiving chamber as the chamber rotates.

2. The pig injector of claim 1 in which the pigs are spherical and the length of the pigs is their diameter.

3. The pig injector of claim 2 in which the rotatable pig receiving chamber comprises a blocked bore formed within a ball in the pig injector valve.

4. The pig injector of claim 1 in which the pigs are elongate and the pig receiving chamber is rotatable 90 degrees to deposit a pig in a pipe with which the magazine forms a junction.

5. The pig injector of claim 4 in which each pig has rounded ends, the rotatable pig receiving chamber is a bore formed within a ball in the pig injector valve, and the diameter of the ball is substantially equal to L.

6. The pig injector of claim 1 further including means to force pigs along the magazine towards the pig injector valve.

7. The pig injector of claim 6 in which the magazine is oriented such that pigs in the magazine are directed by gravity towards the pig injector valve and the means to force pigs along the magazine comprises a weight.

8. The pig injector of claim 1 further including a pig level indicator indicative of the number of pigs in the magazine.

9. The pig injector of claim 8 in which the pig level indicator comprises a magnetic element within the magazine that moves with the pigs and visible magnetic sensors on the outside of the magazine.

10. The pig injector of claim 9 in which the magnetic element is a magnet and the visible magnetic sensors are hinged and spaced along the magazine such that location of the magnet adjacent a visible magnetic sensor causes the visible magnetic sensor to be displaced.

11. The pig injector of claim 1 further including an indentation in the plug for receiving a C-wrench.

12. The pig injector of claim 1 in combination with a pipe having a bore, the magazine extending tranversely from the pipe, in which the rotatable pig receiving chamber of the pig injector valve is alignable with the bore of the pipe.

13. The pig injector of claim 12 in which each pig has rounded ends, the rotatable pig receiving chamber is a bore formed within a ball in the pig injector valve, and the diameter of the ball is substantially equal to L.

14. The pig injector of claim 12 further including means to force pigs along the magazine towards the pig injector valve.

15. The pig injector of claim 14 in which the magazine is oriented such that pigs in the magazine are directed by gravity towards the pig injector valve and the means to force pigs along the magazine comprises a weight.

16. The pig injector of claim 12 further including a pig level indicator indicative of the number of pigs in the magazine.

17. The pig injector of claim 16 in which the pig level indicator comprises a magnetic element within the magazine that moves with the pigs and visible magnetic sensors on the outside of the magazine.

18. The pig injector of claim 17 in which the magnetic element is a magnet and the visible magnetic sensors are hinged and spaced along the magazine such that location of the magnet adjacent a visible magnetic sensor causes the visible magnetic sensor to be displaced.

19. The pig injector of claim 12 further including an indentation in the plug for receiving a C-wrench.

20. The pig injector of claim 12 in which the rotatable pig receiving chamber is rotatable from a first position in which the second open end of the magazine is closed and fluids in the pipe may flow through the pig receiving chamber to a second position in which the pig receiving chamber is aligned with the magazine and the bore of the pipe is closed.

\* \* \* \* \*